US011573412B2

United States Patent
Kleppe et al.

(10) Patent No.: US 11,573,412 B2
(45) Date of Patent: Feb. 7, 2023

(54) HIGH-RESOLUTION SCANNING MICROSCOPY WITH DISCRIMINATION BETWEEN AT LEAST TWO WAVE-LENGTH RANGES

(71) Applicant: Carl Zeiss Microscopy GmbH, Jena (DE)

(72) Inventors: Ingo Kleppe, Jena (DE); Ralf Netz, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 415 days.

(21) Appl. No.: 16/621,883

(22) PCT Filed: Jun. 21, 2018

(86) PCT No.: PCT/EP2018/066589
§ 371 (c)(1),
(2) Date: Dec. 12, 2019

(87) PCT Pub. No.: WO2018/234453
PCT Pub. Date: Dec. 27, 2018

(65) Prior Publication Data
US 2020/0116987 A1    Apr. 16, 2020

(30) Foreign Application Priority Data
Jun. 21, 2017   (DE) ..................... 10 2017 113 683.5

(51) Int. Cl.
*G02B 21/00*   (2006.01)
(52) U.S. Cl.
CPC ....... *G02B 21/008* (2013.01); *G02B 21/0064* (2013.01); *G02B 21/0072* (2013.01)

(58) Field of Classification Search
CPC .............. G02B 21/008; G02B 21/0064; G02B 21/0072; G02B 21/361; G02B 27/58; G02B 21/0076; G02B 26/06
See application file for complete search history.

(56) References Cited

U.S. PATENT DOCUMENTS

| 5,043,570 A | 8/1991 | Takabayashi |
| 5,731,588 A | 3/1998 | Hell et al. |

(Continued)

FOREIGN PATENT DOCUMENTS

| CN | 106770095 A | 5/2017 | |
| DE | 4416558 C2 * | 9/1997 | ............. G01N 21/63 |
| WO | 2016/020459 A1 | 2/2016 | |

OTHER PUBLICATIONS

Chinese Search Report dated Jul. 19, 2021.
(Continued)

*Primary Examiner* — Mustak Choudhury
(74) *Attorney, Agent, or Firm* — Duane Morris LLP; Arthur M. Dresner (57) ABSTRACT

In high-resolution scanning microscopy, a sample is excited by illumination radiation to emit fluorescence radiation in such a way that the illumination radiation is focused at a point in or on the sample to form a diffraction-limited illumination spot. The point is imaged in a diffraction-limited manner into a diffraction image on a spatially resolving surface detector, wherein the surface detector has a spatial resolution that resolves a structure of the diffraction image. The sample is scanned by means of different scanning positions with an increment of less than half the diameter of the illumination spot. An image of the sample is generated from the data of the surface detector and from the scanning positions assigned to said data, said image having a resolution that is increased beyond a resolution limit for imaging. For the purposes of distinguishing between at least (Continued)

two predetermined wavelength regions in the fluorescence radiation from the sample, a corresponding number of diffraction structures are generated on the surface detector for the at least two predetermined wavelength ranges, said diffraction structures differing but having a common center of symmetry. The diffraction structures are evaluated when generating the image of the sample.

16 Claims, 2 Drawing Sheets

(56) References Cited

U.S. PATENT DOCUMENTS

| | | | |
|---|---|---|---|
| 5,866,911 | A | 2/1999 | Baer |
| 5,867,604 | A | 2/1999 | Ben-Levy et al. |
| 6,633,432 | B2 | 10/2003 | Iketaki |
| 6,909,105 | B1 | 6/2005 | Heintzmann et al. |
| 2004/0212799 | A1 | 10/2004 | Hell |
| 2008/0068588 | A1 | 3/2008 | Hess et al. |
| 2009/0134342 | A1 | 5/2009 | Hell et al. |
| 2011/0267688 | A1 | 11/2011 | Kleppe et al. |
| 2013/0222567 | A1 | 8/2013 | Kalkbrenner et al. |
| 2015/0008309 | A1 | 1/2015 | Wolleschensky et al. |
| 2015/0077842 | A1 | 3/2015 | Kleppe et al. |
| 2015/0085099 | A1 | 3/2015 | Kleppe et al. |
| 2016/0131883 | A1 | 5/2016 | Kleppe et al. |
| 2017/0003223 | A1* | 1/2017 | Zubairy .......... G02B 21/16 |
| 2017/0227749 | A1* | 8/2017 | Kleppe .......... G02B 21/008 |
| 2018/0321478 | A1* | 11/2018 | Gugel .......... G02B 5/28 |
| 2019/0056580 | A1 | 2/2019 | Kleppe et al. |

OTHER PUBLICATIONS

Becker, W., "Advanced Time-Correlated Single Photon Counting Techniques"; Springer 2005; 143-146.
Bertero, M., et al.; "Super-resolution in confocal scanning microscopy"; Inverse Problems 1987; 3:195-212.
Grochmalicki, J., et al.; "Superresolving masks for incoherent scanning microscopy"; J. Opt. Soc. Am. A 1993; 10 (5);1074-1077.
Hell, Stefan W.; "Far-Field Optical Nanoscopy"; Science 2007; 316:1153-1158.
Mueller, Claus B., et al.; "Image Scanning Microscopy"; Physical Review Letters 2010; 104(19): 198101-1-198101-4.
Shechtman, Yoav, et al.; "Multicolour localization microscopy by point-spread-function engineering"; Nature Photonics 2016; 10:590-595.
Sheppard, C.J.R.; "Super-resolution in Confocal Imaging"; Optik 1988; 80(2):53-54.
Wang, Wensheng, et al.; "Dual-color super-resolution imaging by fluorescence emission difference microscopy" Imaging and Applied Optics Congress 2016; 1-3.
Weisshart, Klaus; The Basic Principle of Airyscanning; Zeiss Technology Note 2014; 1-21.
You, Shangting, et al.; "Isotropic superresolution imaging for fluorescence emission difference microscopy"; Applied Optics 2014; 53(33): 7838-7844.

* cited by examiner

Fig. 1

HIGH-RESOLUTION SCANNING MICROSCOPY WITH DISCRIMINATION BETWEEN AT LEAST TWO WAVE-LENGTH RANGES

RELATED APPLICATIONS

The present application is a U.S. National Stage application of International PCT Application No. PCT/EP2018/066589 filed on Jun. 21, 2018, which claims priority benefit of German Application No. DE 10 2017 113 683.5 filed on Jun. 21, 2017, the contents of each are incorporated by reference in their entirety.

FIELD OF THE INVENTION

The invention relates to a method for high-resolution scanning microscopy of a sample, wherein the sample is excited by illumination radiation to emit fluorescence radiation in such a way that the illumination radiation is focused at a point in or on the sample to form a diffraction-limited illumination spot, and to a microscope for high-resolution scanning microscopy, which has a sample space for receiving a sample which is excitable to emit fluorescence radiation, an optical unit which has a focal plane, located in the sample space, and a resolution limit, an illumination device, which has an entrance for supplying illumination radiation and illuminates, via the optical unit, the sample space with the illumination radiation in such a way that the optical unit focuses the illumination radiation at a point in the focal plane to form a diffraction-limited illumination spot.

In the method of the invention, the point is imaged in a diffraction-limited manner into a diffraction image on a spatially resolving surface detector. The surface detector has a spatial resolution that resolves a structure of the diffraction image. The point is displaced relative to the sample into different scanning positions with an increment of less than half the diameter of the illumination spot. The surface detector is read, and an image of the sample is generated from the data of the surface detector and from the scanning positions assigned to said data, said image having a resolution that is increased beyond a resolution limit for imaging. For the purposes of distinguishing between at least two predetermined wavelength ranges by means of a spectrally selective module, a number of diffraction structures, said number corresponding to the number of wavelength ranges, are generated on the surface detector, said diffraction structures each being point symmetric with respect to a center of symmetry and being located completely on the surface detector, and the diffraction structures are evaluated when generating the image of the sample.

The microscope of the invention has an imaging device for diffraction-limited imaging of the point in the focal plane via the optical unit into a diffraction image on a spatially resolving surface detector located in an image plane that is conjugate to the focal plane. The surface detector has a spatial resolution that resolves a structure of the diffraction image, a scanning device for displacing the point into different scanning positions with an increment of less than half the diameter of the illumination spot, and an evaluation device for reading the surface detector, for evaluating the structure of the diffraction image from data of the surface detector and from the scanning positions assigned to said data, and for generating an image of the sample that has a resolution that is increased beyond the resolution limit. The microscope further has a spectrally selective module for distinguishing between at least two predetermined wavelength ranges. The selective module generates on the surface detector a number of diffraction structures, the number corresponding to the number of wavelength ranges. The surface detector and the spectrally selective element are embodied in such a way that the diffraction structures are located in full on the surface detector, and the evaluation device evaluates the diffraction structures when generating the image of the sample.

BACKGROUND OF THE INVENTION

One conventional field of application of light microscopy for examining biological preparations is luminescence microscopy. Here, specific dyes (so-called phosphors or fluorophores) are used to specifically label samples, e.g. cell parts. The sample is illuminated with illumination radiation acting as excitation radiation, and the excited luminescence radiation is captured using suitable detectors. In this way, representation of individual, differently colored cell parts in the microscope is possible. It is of course also possible for multiple parts of a preparation to be colored at the same time using different dyes which attach specifically to different structures of the preparation. This method is referred to as multiluminescence. It is also possible to measure samples that luminesce per se, i.e. without the addition of dye.

As is generally the case, luminescence is here understood to be the umbrella term for phosphorescence and fluorescence, i.e. it encompasses both processes. Where fluorescence is mentioned here, this is intended to be understood pars pro toto and not in a limiting fashion.

For examining samples, it is also known to use laser scanning microscopes (also LSM for short) which use a confocal detection arrangement (in that case referred to as a confocal LSM) or a non-linear sample interaction (so-called multiphoton microscopy) to image only that plane of the sample that is located in the focal plane of the objective. An optical section is obtained, and the recording of multiple optical sections at different depths of the sample allows the generation of a three-dimensional image of the sample, which is then made up of the different optical sections. Laser scanning microscopy is therefore suitable for examining thick preparations. A combination of luminescence microscopy and laser scanning microscopy is of course also used, in which a luminescent sample is imaged in different depth planes using an LSM.

In principle, the optical resolution of a light microscope, including that of an LSM, is diffraction-limited by physical laws. The term "high-resolution" is here used for resolutions beyond the diffraction limit.

U.S. Pat. No. 5,043,570 B1 describes an attempt to increase the resolution by way of "oversampling." This does not result in a significantly increased resolution below the diffraction limit of the microscope.

Using non-linear depopulation processes, the resolution can be raised to a factor of up to 10 above that of a diffraction-limited confocal LSM. Such a method is described, for example, in U.S. Pat. No. 5,866,911 B1. For the depopulation processes, different approaches are known, for example those described in DE 4416558 C2, U.S. Pat. No. 6,633,432 B1 or DE 10325460 A1.

Another high-resolution microscopy method is mentioned in U.S. Pat. No. 5,867,604 B1, in which an object is scanned with a periodic structure. A similar method for increasing resolution is also described by EP 1157297 B1. Structured illumination uses non-linear processes, e.g. saturation of the fluorescence. The approach requires a reconstruction algorithm for image generation and the use of multiple recordings for an image.

A method that achieves high resolution in the wide field is known from WO 2006/127692 A1 and DE 102006021317 A1. This method, shortened to PALM (photo-activated light microscopy), uses a labeling substance that can be activated using an optical activation signal. Only in the activated state can the labeling substance be excited to emit specific fluorescence radiation. The activation is effected such that at least a specific portion of the activated labeling molecules is arranged at a distance from neighboring activated molecules such that the labeling molecules of the portion are separated, or can be separated retrospectively, measured on the optical resolution of the microscopy. After recording of the luminescence radiation, for said isolated molecules, the center of their radiation distribution due to resolution limits is then ascertained and, on that basis, the position of the molecules is determined by way of calculation with greater accuracy than would actually be possible with optical imaging. To image the entire sample, the isolation of the labeling molecules by activation radiation, subsequent excitation and fluorescence radiation imaging is repeated until all labeling molecules, where possible, are included once in a subset and have been isolated.

Further high-resolution methods are described in Hell, "Far-Field Optical Nanoscopy," Science 316, 1153-1158, 2007.

EP 2317362 A1 has disclosed the so-called Airy scan microscopy. This document combines, in the embodiment illustrated and described in FIG. 5 therein, diffraction-limited illumination of the sample with a surface detector, wherein a scanning device is configured such that the diffraction image of the point that is illuminated with the illumination spot rests on the surface detector. This arrangement is referred to as a so-called "de-scanned" detector arrangement. It is typically achieved by disposing a scanner that deflects the beam path between the sample and the combination point between illumination device and imaging device. Such a scanner acts both on the illumination spot and on the imaging of the point that is illuminated with the illumination spot, with the result that the beam path in the imaging direction after the scanner is static. An alternative to such a scanner is the use of a movable sample stage which displaces the sample. In that case, the diffraction image also rests on the surface detector. In the concept of EP 2317362 A1, the surface detector is provided with a spatial resolution that, with reference to the imaging scale, effects oversampling of the diffraction image and thus permits resolving the structure of the diffraction image. EP 2317362 A1 also provides an embodiment in which color analysis is possible. Multiple detectors are provided herefor, which are located in corresponding spectral channels that are formed by a dichroic color splitter. This approach has long been known for laser scanning microscopy. However, it has the disadvantage that a corresponding color splitter having a corresponding detector is required for each color channel. In conventional laser scanning microscopy, which uses a non-spatially resolving detector behind a confocal pinhole, this requirement is largely unproblematic; but using an oversampling surface detector in accordance with EP 2317362 A1 is associated with a considerable outlay, especially since such surface detectors are expensive. In the oversampling principle according to EP 2317362 A1, a plurality of these surface detectors have to be adjusted with sub-pixel accuracy relative to one another because otherwise a chromatic aberration would arise between the generated images of the individual color channels. The images of the individual color channels fit over one another only if the surface detectors are adjusted with sub-pixel accuracy in all color channels with respect to the optical axis.

The generic document WO 2016/020459 A1 develops Airy scan microscopy to the effect of the diffraction image being provided with an appropriate number of diffraction structures for at least two predetermined wavelength ranges by means of a spectrally selective element, said diffraction structures each being embodied as point symmetric Airy disks and being located laterally next to one another in full on the same surface detector. A color image corresponding to the at least two wavelength ranges can be generated by way of an appropriate evaluation of the diffraction structures. This approach requires only one surface detector. The Airy disks are located next to one another thereon.

OBJECT OF THE INVENTION

The invention is based on the object of developing a method and a microscope of this type in such a way that the image quality is improved in the at least two predetermined wavelength ranges.

SUMMARY OF THE INVENTION

The invention is defined in claims 1 and 9.

In a method for high-resolution scanning microscopy of a sample, the sample is excited by illumination radiation to emit fluorescence radiation in such a way that the illumination radiation is focused at a point in or on the sample to form a diffraction-limited illumination spot. The point is imaged in a diffraction-limited manner into a diffraction image on a spatially resolving surface detector, wherein the surface detector has a spatial resolution that resolves a structure of the diffraction image. The point is displaced relative to the sample into different scanning positions with an increment of less than half the diameter of the illumination spot. An image of the sample is generated from the data of the surface detector and the scanning positions assigned to said data, said image having a resolution that is increased beyond a resolution limit for imaging. For the purposes of distinguishing between at least two predetermined wavelength ranges, a spectrally selective module is used to provide a number of diffraction structures on the diffraction image, said number of diffraction structures corresponding to the number of predetermined wavelength ranges. The diffraction structures are located on the surface detector and are evaluated when generating the image of the sample.

A microscope for high-resolution scanning microscopy, comprising a sample space for receiving a sample which is excitable to emit fluorescence radiation, comprises an optical unit which has a focal plane, located in the sample space, and a resolution limit, and an illumination device, which has an entrance for supplying illumination radiation and illuminates, via the optical unit, the sample space with the illumination radiation in such a way that the optical unit focuses the illumination radiation at a point in the focal plane to form a diffraction-limited illumination spot. An imaging device images the point in the focal plane via the optical unit into a diffraction image on a spatially resolving surface detector located in a detector plane that is conjugate to the focal plane. The surface detector has a spatial resolution that resolves a structure of the diffraction image. A scanning device displaces the point into different scanning positions with an increment of less than half the diameter of the illumination spot, and an evaluation device 22 reads the surface detector and evaluates the diffraction structure of the diffraction image in data thereof. Naturally, it also takes account of the scanning positions assigned to this data in this case. It generates an image of the sample that has a resolution that is increased beyond the resolution limit. For distinguishing between at least two predetermined wavelength ranges, the microscope comprises a spectrally selective module which on the surface detector provides the diffraction image with a number of diffraction structures, said number corresponding to the number of two predetermined wavelength ranges, wherein the surface detector and the spectrally selective module are embodied in such a way that the diffraction structures are located in full on the surface detector, and the evaluation device evaluates the diffraction structures when generating the image of the sample.

When observing a point located on the optical axis in or on the sample, the diffraction structures are each point symmetric with respect to a center of symmetry. The point symmetric diffraction structures cover different regions of the surface detector but have the common center of symmetry, which is likewise located on the optical axis for the observed point. The phrase "center of symmetry" of the optical system or of the method is characterized by the effect on a point located on the optical axis. This does not preclude points being imaged next to the optical axis. It was found that such diffraction structures supply a color resolution which impairs the spatial resolution to the least possible extent. Coaxial structures, in which an inner diffraction structure is an Airy disk which surrounds an outer diffraction structure in ring-shaped fashion, are an example of such diffraction structures. Another example would be given by two or more elongate diffraction structures, which each have, e.g., the form of a figure of eight or a dumbbell but which are rotated on the surface detector in relation to one another through an angle of, e.g., 90° in the case of two diffraction structures.

The invention obtains a simultaneous increase in resolution and spectral image information using only a single surface detector by virtue of the diffraction image on the detector being divided into at least two diffraction structures. To this end, use is made of the spectrally selective module, which is characterized by observing a point, located on the optical axis, in or on the sample. Each diffraction structure is associated with a wavelength range (which is also referred to as a color channel). Using this, the method and the microscope render it possible to distinguish between at least two wavelength ranges. As is conventional in an Airy scan, the image of the sample arises by scanning the sample with the spot from a multiplicity of individual images, which are each associated with a different scanning location, i.e., a different scanning position. Surprisingly, the different, yet with respect to a common center of symmetry point symmetric diffraction structures of the color regions yield an improved spatial resolution in the image when evaluating and generating the optical image. In particular, the resolution has been increased over the version according to WO 2016/020459 A1, in which Airy disks are located next to one another on the detector.

The diffraction structures can be designed differently by virtue of the radiation in one wavelength range being spatially distributed in the image plane while the radiation in the other is not. Maximum resolution in the image is obtained if the diffraction structures are kept coaxial in the process. Therefore, one embodiment preferably provides for the diffraction structures to be coaxial, in particular in the form of a spatially non-redistributed diffraction structure for a first wavelength range and a ring-shaped diffraction structure, surrounding said first diffraction structure, for a second wavelength range.

In another embodiment, provision is made for all predetermined wavelength ranges to be subject to different phase manipulation.

A particularly simple construction combines a phase influencing device with a spectrally selective filter in the module, for example in such a way that the spectrally selective filter guides the radiation in one wavelength range through a phase mask, whereas the radiation in another wavelength range is not guided through a phase mask or is guided through a different phase mask by said filter. As a result, the wavelength ranges are subject to different phase manipulation.

An Airy disk arises when diffracting an optical beam at a circular stop. A central maximum, the Airy disk, which is surrounded by rings of reducing radiation intensity appears. Even a microscope that is perfect according to the laws of geometrical optics, i.e. even without imaging aberrations, cannot image a point exactly on a point, but only on an out-of-focus spot as a result of the diffraction of the light at the aperture. This is referred to as diffraction-limited imaging. The same applies in the case of diffraction-limited illumination of a point. In classical beam optics, two points can be separated according to the so-called Rayleigh criterion if the maxima of their images in the diffraction image are spaced apart by at least the radius r of the Airy disk. The shape of the spot has a reciprocal relationship to the shape of the aperture; in particular, its size is inversely proportional to the size of the aperture. The size of the Airy disk emerges from the first zero of the Bessel function of the first kind, which lies at approximately r=0.6098. The Airy disk (i.e. the central diffraction spot) is named after the English astronomer George Biddell Airy. In the scanning microscope, the aperture, given by the round mounts of the optical units, is circular both in the illumination and in the imaging. Since the size of the Airy disk moreover depends on the wavelength, it is smaller in the case of the diffraction-limited illumination serving for excitation purposes than in the case of the Stokes-shifted, i.e. longer wavelength fluorescence radiation.

The term "diffraction-limited" is here not intended to be limited to the diffraction limit in accordance with Abbe's theory, but also to encompass cases in which the theoretical maximum is missed by 20% for reasons of real inadequacies or limitations. Even here the individual image has a structure that is referred to here as diffraction structure. It is oversampled.

Point symmetric diffraction structures for the wavelength ranges can be generated in different ways, wherein the spectrally selective module also influences the diffraction image in each case, for example by virtue of comprising a phase influencing device that has a different effect on the two different wavelengths or by virtue of the spectrally selective module guiding the wavelength ranges through different phase influencing elements. In principle, the spectral selection is preferably carried out near a pupil, in any case not in an intermediate image of the beam path. To the extent that reference is made to the spectrally selective module or to the spectral separation below, this also means the different shaping of the diffraction structures such that these are point symmetric in each case and located with a common center of symmetry on the surface detector. In a first variant, the spectrally selective module and the spectral separation are disposed and undertaken, respectively, in the imaging beam path and not in a part of the beam path through which the illumination radiation also propagates. Then, the imaging radiation propagates along the beam path to the spectrally selective module, where the shaping of the different diffraction structures of the individual wavelength ranges is implemented. In a second variant, the spectral separation in the illumination or in the illumination device is implemented in such a way that the imaging is not affected by the spectral separation. In this way, the illumination spot in the sample already arises in the form of a plurality of different diffraction structures, which are point symmetric with respect to a common center of symmetry.

In the variant specified first, the spectral separation only acts on the fluorescence radiation from the sample. In the variant specified second, it acts only on the fluorescence excitation for the sample. Consequently, the first variant separates color channels of a sample fluorescing in different colors. By contrast, the second variant distinguishes constituent parts of the sample that are excitable at different wavelength ranges. What is common to both variants is that the spectrally sensitive module is located in part of the beam path that is irradiated only by the imaging or the illumination, but not by both. Deviating therefrom, an arrangement in a common part of the beam path is also possible.

The core of the invention lies in distinguishing between the wavelength ranges in space by way of the position and orientation of the diffraction structures on the surface detector and in ensuring a particularly good resolution as a result of the point symmetry with respect to the common center of symmetry. Demixing the simultaneously recorded wavelength ranges when generating the image is possible at a particularly high resolution. This achieves simultaneous recording of a plurality of color channels using a single surface detector.

Since a multiplicity of measurements are available for each individual point in the sample in the reconstruction method according to WO 2016/020459 A1 or EP 2317362 A1 on account of the scanning displacement with an increment that is smaller than the size of the illumination spot, this yields an overdetermination of the system of equations to be constructed and solved, and so it is possible to specify not only the spatial specifications and intensities for the individual points with a high resolution, but also the specification of the wavelength ranges, i.e. the color.

The reconstruction uses a point spread function (PSF), which is wavelength-dependent and has the center of symmetry on the optical axis for the point specified at the outset.

Imaging of a desired region of the sample is effected in a scanning manner, as in a typical LSM. The concept according to the invention can also be carried out simultaneously in a parallelized form for a plurality of spots, as is known from WO 2016/020459 A1.

Where a method is described here, a controller of the microscope implements these method steps during operation of the microscope.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION OF THE DRAWINGS

Figure 1:
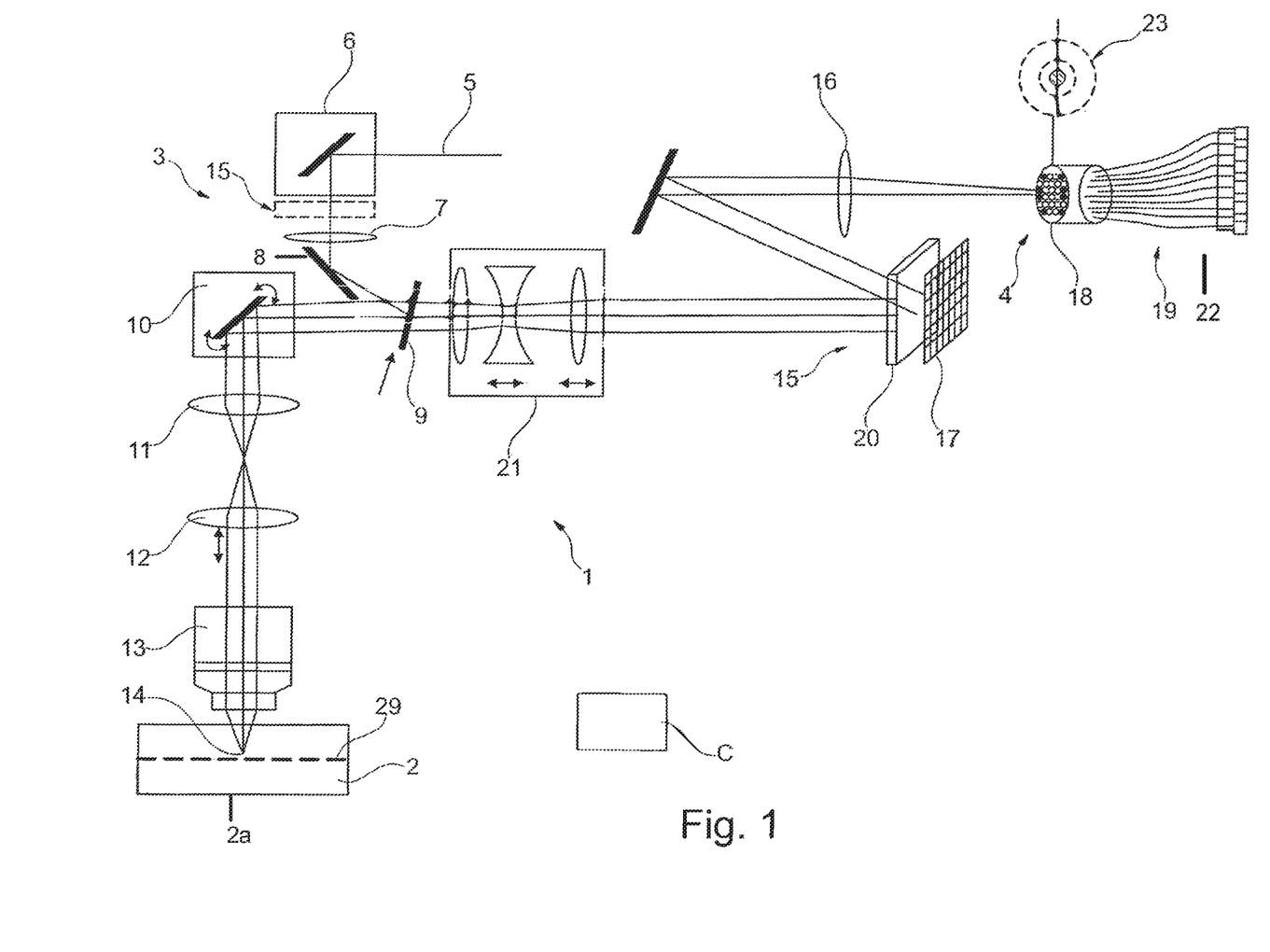
FIG. 1 is a schematic illustration of a laser scanning microscope for high-resolution microscopy.

FIG. 1 schematically illustrates a laser scanning microscope 1 configured for examining a sample 2 under a microscope. The laser scanning microscope (referred to below as LSM) 1 is controlled by a controller C and comprises an illumination beam path 3 and an imaging beam path 4. The illumination beam path 3 illuminates a spot in the sample 2 (on a sample space or stage 2a), and the imaging beam path 4 images said spot in a diffraction-limited manner on a detector. Illumination beam path 3 and imaging beam path 4 share optical elements.

The sample 2 is illuminated in the LSM 1 using a provided laser beam 5 which is coupled to a mirror 8 via a deflection mirror 6, which is otherwise not functionally necessary, and a lens 7. The mirror 8 ensures that the laser beam 5 is incident on an input coupling element, e.g. an emission filter 9, at a reflection angle. For clarity, only the principal axis thereof is drawn for the laser beam 5.

After the laser beam 5 is reflected at the emission filter 9, it is biaxially deflected by a scanner 10 and focused in the form of a diffraction-limited illumination spot 14 in a focal plane 29 in the sample 2 using lenses 11 and 12 through an objective 13. Here, the illumination spot 14 is punctiform in the illustration of FIG. 1; however, a differently shaped illumination spot is also possible, as is yet to be explained below on the basis of FIG. 6. Fluorescence radiation that was excited at the location (e.g. point) of the illumination spot 14 is guided out of the focal plane 29 via the objective 13, the lenses 11 and 12 back to the scanner 10, after which a static light beam is once again present in the imaging direction. The latter passes through the emission filter 9, which as a result additionally has the function of blocking from the fluorescence radiation illumination radiation that can serve, for example, as excitation radiation and that is reflected back in mirrored fashion in the illumination spot 14. Subsequently, the radiation passes through a module 15, which will be explained below. Finally, a lens 16 ensures that, overall, the location of the illumination spot 14 is imaged in a diffraction-limited diffraction image, which is located in an image plane 18 and which will be explained in more detail. The image plane 18 is a plane conjugate to the focal plane 29, in which the illumination spot 14 in the sample 2 is located.

The diffraction image is recorded in the image plane 18 by a surface detector 19. It resolves the diffraction image in the image plane 18, i.e., brings about oversampling. In purely exemplary fashion, the surface detector 19 comprises an optical fiber bundle, which feeds a detector array. The extent of the optical fiber bundle entrance is so large that the extent of the diffraction image is covered thereby. At their outputs, the individual optical fibers in the optical fiber bundle are brought into a different geometric arrangement than at the optical fiber bundle entrance, specifically in the form of an elongate plug in which the output-side ends of the optical fibers are located next to one another. The plug has an embodiment that fits to the geometric arrangement of a detector row, i.e., each output-side end of an optical fiber lies exactly in front of a pixel of the detector row. Reference is made to the fact that this embodiment of the surface detector 19 is purely exemplary. In principle, a surface detector 19 that undertakes oversampling of the diffraction image in the image plane 18 is sufficient for the microscope 1. In particular, the surface detector 19 can also be a rectangular detector surface in the image plane 18, as is the case in FIGS. 2 to 4 described below.

The controller C controls all components of the LSM 1, in particular scanner 10 and surface detector 19. The controller records for different scan positions the data of the diffraction image, analyzes the diffraction structure thereof and generates a high-resolution overall image of the sample 2.

Since the illumination sport 14 in the embodiment of FIG. 1 is a point spot in exemplary fashion, the diffraction image would be an Airy disk. However, as a result of the module 15, spectral selection is used in the microscope 1 in such a way that the diffraction image is modified in wavelength-dependent fashion and consequently obtains two diffraction structures in the embodiment of FIG. 1, said diffraction structures being associated with two wavelength ranges. The diffraction image 23 arising as a result thereof in the image plane 18 thus consists of a plurality of diffraction structures, the type and geometry of which will still be explained. The module 15 comprises a spectrally selective element 20 and is disposed in the imaging device H or, alternatively, in the illumination device 3. Below, the effect and arrangement of the spectrally selective module 15 in the imaging device is explained first.

Without the spectrally selective module 15, a diffraction image that is an Airy disk on account of the circular aperture of the objective 13 would arise in the associated conjugate image plane 18 in the case of diffraction-limited imaging of the point, illuminated by the illumination spot 14, in the focal plane 29, as already explained below. How such Airy disks arise was already explained, in general, in the description. In microscopy as described in EP 2317362 A1, the structure of the diffraction image is analyzed by oversampling thereof, and, in conjunction with the scanning positions that have an increment that is small in relation to the minimum dimension of the illumination spot 14, there can be a structure elucidation which goes beyond the resolution limit of the diffraction-limited imaging. For explanation purposes, imagine two places are considered which lie so closely together in the focal plane 29 that they cannot be captured by the diffraction-limited resolution. When scanning the illumination spot 14 with increments that are small in relation to the diameter of the illumination spot (that is circular in this thought experiment), one of the two places initially enters the illumination spot. The radiation intensity in the diffraction image increases as ever more of this first place enters the illumination spot 14. On account of its diffraction-limited properties, the illumination spot 14 has an intensity that increases toward the center. Consequently, the intensity of the radiation in the diffraction image increases to the extent with which the considered first place moves more and more into the center of the illumination spot 14. Once the center of the illumination spot 14 has migrated over the considered place, the intensity of the radiation from this first place reduces again. If there were no neighboring imagined second place, the radiation intensity in the diffraction image would decay again, with the increase and the reduction in the radiation intensity in the diffraction image correlating exactly with the profile of the illumination intensity of the illumination spot 14 (taking account of the increment and the fluorescence-sensitivity of the first place). However, since a second place is present in close proximity, this second place likewise begins to add fluorescence radiation to the diffraction image, to be precise ever more, the closer the center of the illumination spot 14 comes thereto. Otherwise, exactly the same naturally applies to the second place as to the first place. As a result, illumination intensities are obtained in the diffraction image for the increment positions which are different than if only a single fluorescent place were present. By evaluating the data of the surface detector 19 and taking account of the current scanning position, it is consequently possible to mathematically ascertain that two places fluoresce in the focal plane 29, and also the spacing therebetween, even though these two places would not be identifiable with a diffraction-limited resolution on its own. In the implementation that is technically known to a person skilled in the art, an equation is constructed for each scanning position for the purposes of evaluating the data of the surface detector 19, said equation containing multiple unknowns, in particular the intensity and spacing of the places in the focal plane 29. As a result of the multiplicity of scanning positions, a system of equations that is overdetermined and that renders it possible to ascertain radiation intensity and spacing, i.e. consequently also the position, of the fluorescent places is obtained. This will still be explained below.

Figure 2:
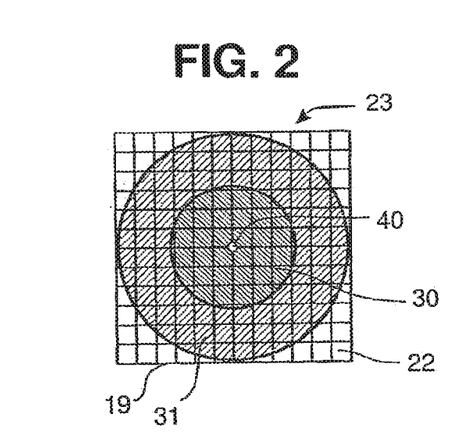
FIGS. 2 to 4 are illustrations of diffraction images that occur on the surface detector during the operation of the microscope of FIG. 1 in various embodiments.

This principle of high-resolution microscopy is now developed by the microscope 1 to the effect of the spectrally selective module 15 influencing the diffraction image 23 in the image plane 18 that is conjugate the focal plane 29, the influencing being such that said diffraction image comprises two different, point symmetric diffraction structures for two wavelength ranges (color channels), said diffraction structures having a common center of symmetry. In the embodiment according to FIG. 1, this is achieved by virtue of a spectrally selective filter 20 reflecting radiation of a first wavelength range and transmitting radiation of a second wavelength range. The radiation of the reflected wavelength range is imaged by an optical unit 16 and a deflection mirror, only serving for the compactness of the beam path, into the image plane 18 and hence onto the surface detector 19. Hence, the aforementioned Airy disk arises as diffraction structure for the first wavelength range. By contrast, the radiation of the second wavelength range is transmitted by the spectrally selective filter 20 and said radiation reaches a phase-manipulating element, for example a phase mask 17 or an LCOS-SLM. The radiation of the second wavelength range is then reflected and equally imaged as a diffraction-limited image into the image plane 18 by the deflection mirror and the optical unit. On account of the action of the phase mask 17 or the LCOS-SLM, the diffraction structure now is not an Airy disk in this case but has the form of a donut, i.e., it is ring-shaped in the image plane 18. Hence, the diffraction structure of the second wavelength range surrounds that of the first wavelength range. Both are coaxial, i.e., they have a common center of symmetry in the middle of the image plane 18, and hence on the surface detector 19. FIG. 2 shows this embodiment in exemplary fashion for a square surface detector 19, which oversamples the diffraction image 23 by means of pixels 22. The diffraction image consists of the first diffraction structure 30, which is assigned to the first wavelength range and hence color channel. It has the form of an Airy disk and is point symmetric with respect to a center of symmetry 40, which is plotted in FIG. 2 as a white dot in exemplary fashion. The first diffraction structure 30 is surrounded by a ring-shaped, second diffraction structure 31, which is formed by the radiation that was transmitted at the spectrally selective filter 15 and influenced by the phase mask 17 or the LCOS-SLM in respect of the phase. The second diffraction structure 31, too, is point symmetric with respect to the center of symmetry 40, i.e., surrounds the first diffraction structure 30 in coaxial fashion. The wavelength boundaries of the color channels are defined by the spectrally selective filter 15, which is therefore chosen to fit predetermined color channels (wavelength ranges) in one embodiment.

The combination of the diffraction structures 30, 31 forms the diffraction image 23, i.e., the diffraction structures 30, 31 do not move in space during the examination by microscope. The Airy disks of the microscope according to WO 2016/020459 A1, originally located next to one another, are now replaced by the two coaxial diffraction structures 30, 31.

Imagine, again, that two places located in the focal plane 29 are considered, said places being so close together that they would not be resolvable with diffraction-limited imaging per se, then the following behavior arises in the microscope 1 on account of the spectrally selective element 15 if the assumption is made that the first place fluoresces in the first color channel, to which the first diffraction structure 30 is assigned, and the second place fluoresces in the second color channel, to which the second diffraction structure 31 is assigned: as soon as the illumination spot 14 captures the first place, the center, i.e., the first diffraction structure 30, starts to shine in the diffraction image 23. By contrast, the periphery, i.e., the second diffraction structure 31, still remains dark since no radiation arrives in the second color channel for as long as the second place is not illuminated by the illumination spot 14 as well. The intensity in the first diffraction structure 30 increases until the first place is captured by the center of the illumination spot 14. Then, the intensity at the center, i.e., the intensity of the diffraction structure 30, of the first color channel is at a maximum. An analogous statement applies to the diffraction structure 31 and the second color channel and the second place when the illumination spot 14 has advanced. As a result, a brightening and darkening of the first diffraction structure 30 and, slightly later in time, a brightening and darkening of the second diffraction structure 31 are obtained when passing over the two places with the illumination spot 14. By contrast, simultaneous brightening and darkening would arise if fluorescence were to be emitted in both color channels at one location. Consequently, both the location information and the color information can be extracted by the image evaluation. The spatial resolution is not impaired by the color resolution as a result of the coaxial position and orientation of the two diffraction structures 30, 31.

Evaluating the data of the surface detector 19 in combination with the scanning positions allows an equation to be set up for each scanning position, said equation not only containing the position and orientation and fluorescence intensity of both places but also a statement about whether the first or second place shines in the first or second color channel. As a result of the multiplicity of scanning positions, an overdetermined system of equations arises, which also allows ascertainment of the additional assignment of the shining places to the two color channels. In this way, the microscope 1 and the associated microscopy method can distinguish between two wavelength ranges (color channels) in the high-resolution image and obtains a two-color image without additional detectors.

It should be stressed that the coaxial position and orientation of the diffraction structures 30, 31 remains constant during the examination by microscope; in particular, no color information scales with position and orientation. Said coaxial position and orientation only serves for the prevention of the diffraction structures 30, 31 being located completely over one another in space and consequently allows the latter to supply distinguishable color information during the image evaluation.

Figure 3:
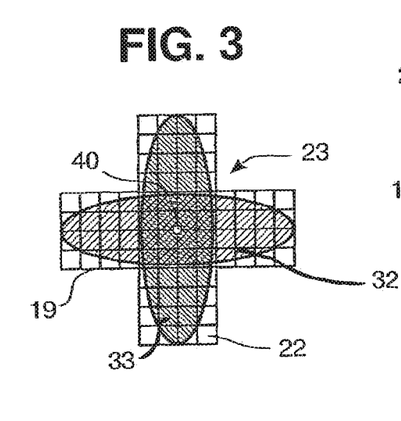
Figure 4:
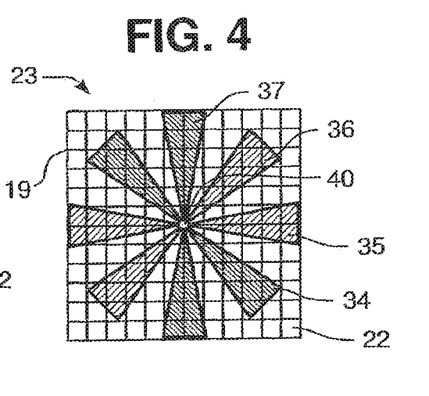

In the embodiment of the spectrally selective module 15, as is used for FIG. 1, the diffraction structures 30, 31 are circularly rotationally symmetric. The described approach is not restricted to the use of such structures or to the use of only two wavelength ranges (color channels). FIGS. 3 and 4 show other point-symmetric shapes for the diffraction structures.

According to FIG. 3, the diffraction structures are each longitudinally distorted spots 32, 33, which are presented as elliptical spots purely for elucidation purposes. They are each point symmetric with respect to the center of symmetry 40, but extend along different axes. The axes are orthogonal in the embodiment of FIG. 3. FIG. 3 further shows that the diffraction structures of the wavelength ranges need not necessarily be disjoint, i.e., have a non-overlapping embodiment. On account of the overdetermination of the system of equations, overlapping regions are by all means possible; a person skilled in the art is also already aware of this from WO 2016/020459 A1, in that case for Airy disks located next one another. FIG. 3 additionally shows an option that comes into question for all embodiments, in particular with the use of a surface detector 19 comprising a light guide. Here, the surface detector 19 only has pixels 22 at those places where radiation intensity of the diffraction image 23 is also incident. Since, as mentioned previously, the diffraction image 23 rests in the image plane 18, an appropriate adaptation of the surface detector 19 is possible.

FIG. 4 shows that even more than two color channels are possible. Here, the diffraction structures 34-37 have the form of a dumbbell, once again with symmetry in relation to the center of symmetry 40. The rotational position of the diffraction structures 34-37 depends on the wavelength, and so four wavelength ranges, i.e., color channels, are realized in the embodiment of FIG. 4. The plurality of color channels are therefore possible because, on account of the multiplicity of scanning positions, the system of equations obtained is overdetermined in such a way that, as it were, there still is space for further unknowns within the meaning of color channels.

Figure 5:
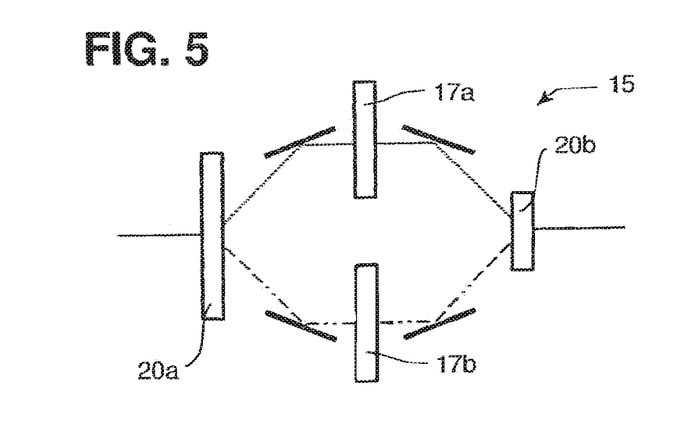
FIG. 5 shows a beam path of a spectral division.

In the embodiments of FIGS. 3 and 4, the spectrally selective module 15 and the beam path downstream thereof are configured in such a way that all wavelength ranges and not only one wavelength range, as illustrated in FIG. 1, are subject to a phase manipulation. FIG. 5 shows an embodiment for such a spectrally selective module 15, in which two wavelength ranges, i.e., color channels, are separated and subject to different phase manipulation, as is the case in the embodiment of FIG. 3, for example. The spectrally selective module 15 comprises a spectrally selective filter 20*a*, which separates the incident radiation according to two wavelength ranges indicated by different dashed lines. The radiation of the one wavelength range passes through a first phase-manipulating element 17*a*; the radiation of the other wavelength range passes through a second, different phase-manipulating element 17*b*. Subsequently, the radiations manipulated differently in this way are superposed again by a unification elements 20*b* and reach the optical unit 16 from there.

The assumption was made in the previous description that the spectrally selective module 15 is located in the imaging device and, therein, located in the part of the beam path only acting for the imaging. Expressed differently, the spectrally selective module 15 is not passed by illumination radiation in these embodiments. Consequently, the color channels that are generated by the spectrally selective module 15 by way of the different diffraction structures are color channels of the fluorescing sample. The embodiments of the microscope or of the microscopy method consequently differentiate the fluorescing radiation in respect of the wavelength range (color channel) thereof.

Figure 6:
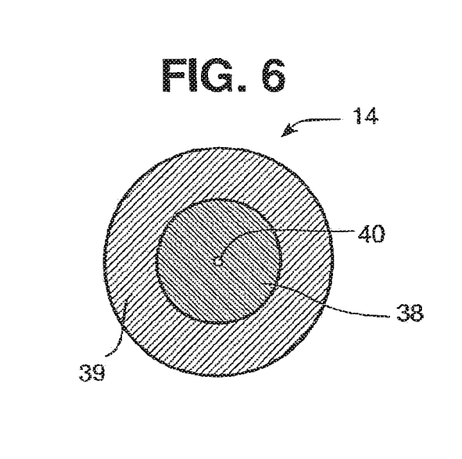
FIG. 6 is an illustration of an illumination diffraction image, which may arise when illuminating a sample in an embodiment of the microscope of FIG. 1.

However, the spectrally selective module 15 may also be disposed in the illumination device 3. This arrangement is plotted using dashed lines in FIG. 1. The spectrally selective module 15 then lies in a region of the beam path that is only passed by illumination radiation. It does not act on the imaging but only on the illumination. The spectrally selective module 15 then splits the illumination spot 14 in two illumination diffraction structures 38, 39, as shown in the illustration of FIG. 6. They differ and have the common center of symmetry 40. Consequently, the spectrally selective module 15 in the illumination beam path creates illumination color channels, whereas the arrangement of the spectrally selective element 15 in the imaging beam path generated detection color channels. As a result, the sample is no longer illuminated by an Airy disk, for example, but by a plurality of different illumination diffraction structures 38, 39. As a result, a situation as in FIG. 3 is also obtained on the surface detector 19, wherein the diffraction structures 30, 31 now no longer correspond to different color channels of the fluorescence radiation, i.e., a fluorescent response, of the sample 2 but to different color channels of the excitation, i.e., a fluorescence sensitivity, of the sample 2. Otherwise, all variants, which were explained on the basis of FIGS. 2 to 4 for the embodiment of the diffraction structures, can equally also be used for the variants of the arrangement of the spectrally selective module 15 in the illumination device 3. However, on account of the different geometric orientation and position, the configuration of the spectrally selective module 15 will, as a rule, look slightly different when disposed in the imaging device than when disposed in the illumination device 3. In principle, a multiplicity of elements that have a chromatic effect, for example a wedge, a prism, a reflecting means or a lens doublet, come into question for the spectrally selective filter 20 and the phase-manipulating element 17 of the module 15.

In a variant to the aforementioned alternatives, the spectrally selective module 15 may also be placed into a part of the beam path through which light propagates both during the illumination and during imaging, or use is made of two spectrally selective modules 15. This can prevent crosstalk during the simultaneous excitation of two dyes with one wavelength. Additionally, options arise for calibration measurements.

Since illumination and imaging or the corresponding devices have a common optical scanning device that guides the illumination spot over the sample and at the same time descans, with respect to the detector, the point which coincides with the illumination spot and at which the sample is imaged, it is possible for a zoom optical unit 21 to be placed in the imaging beam path. It allows the diffraction image 23 to be fit to the size of the surface detector 19.

When arranging the spectrally selective module 15 in the illumination device 3, the case may occur where the shorter illumination wavelength during illumination with two or more illumination color channels generates a fluorescence signal in the wavelength range of the generated fluorescence of the longer-wavelength illumination. The consequence of this would be that one of the structures would reappear as a displaced shadow image. The shadow image component can be determined and eliminated by means of a suitable correlation calculation.

For a better explanation of the mathematical analysis of the establishment of the aforementioned system of equations, initially, only the case that only one color occurs, i.e. the spectrally selective module 15 is omitted, is considered. If O(r) denotes the object, E(r) denotes the point spread function (PSF) of the excitation, and H(r) denotes the PSF of the detection, for each image point the following equation is obtained as the signal D(r,p), wherein r denotes the distance from the location p of the illumination spot:

$$D(r, p) = \int_r O(p - r')E(r')H(r' + r)dr' \quad (1)$$

A Fourier transform of D(r,p) with respect to the location p gives:

$$D(r,\omega) = O(\omega)FT_{r'}\{E(r')H(r'+r)\} \quad (2)$$

The product in real space becomes the following convolution in Fourier space:

$$D(r, \omega) = O(\omega)\int_\omega E(\omega')H(\omega - \omega')e^{i(\omega-\omega')r}d\omega' \quad (3)$$

If a support function is introduced at the location r:

$$EH(r,\omega) = FT^{r'}\{E(r')H(r'+r)\} \quad (4)$$

the result for the equation (2) is $$D(r,\omega) = O(\omega)EH(r,\omega) \quad (5)$$

Different locations r at the surface detector are combined using a Wiener filter)

$$\tilde{O}(\omega) = \frac{\sum_r D(r, \omega)EH^*(r, \omega)}{\langle|n(\omega)|^2\rangle/\langle|O(\omega)|^2\rangle + \sum_r |EH(r, \omega)|^2}, \quad (6)$$

where $\langle|O(\omega)|^2\rangle$ and $\langle|n(\omega)|^2\rangle$ are the corresponding spectral power densities of the signal ("O") and of the noise (n).

This implies that, for a plurality of color channels, i.e., a wavelength-dependent PSF with different $H_c(r, \omega)$, which are mixed at each pixel of the surface detector 19, the weightings predetermined by the PSF are obtained as follows:

$$D(r, \omega) = \sum_c O_c(\omega)EH_c(r, \omega) \quad (7)$$

In this equation, c is the color channel index. If the equation (7) is written as a matrix, then:

$$[D(r,\omega)]_r = [O_c(\omega)]_c[EH_c(r,\omega)]_{c,r} \quad (8)$$

If additional noise is taken into consideration, equation (8) takes the following form:

$$[\tilde{D}(r,\omega)]_r = [O_c(\omega)]_c[EH_c(r,\omega)]_{c,r} + [N(r,\omega)]_r \quad (9)$$

The object $[O_c(\omega)]_c$ can be obtained using an operator $[G_c(r,\omega)]_{r,c}$ which combines frequency filtering and color channel demixing:

$$[O_c(\omega)]_c = [G_c(r,\omega)]_{r,c} [\tilde{D}r,\omega)]_r \tag{10}$$

As in the derivation of the Wiener filter, the quadratic distance between the reconstructed and the real object for each frequency and each color channel must then be minimized.

$$E|[O_c(\omega)]_c - [\tilde{D}(r,\omega)]_r [G_c(r,\omega)]_{r,c}|^2 = min \tag{11}$$

Using equation (9), the following is thus obtained:

$$E|\{[O_c(\omega)]_c [EH_c(r,\omega)]_{c,r} + [N(r,\omega)]_r\}[G_c(r,\omega)]_{r,c} - [O_c(\omega)]|^2 = min \tag{12}$$

By applying the same principles as in the derivation of the Wiener filter, as is known to a person skilled in the art for example from http://en.wikipedia.org/wiki/Wiener_deconvolution, the following is obtained:

$$[O_c(\omega)]_c = [D(r,\omega)]_r \{[EH_c(r,\omega)]^*_{c,r} [I]_c [EH_c(r,\omega)]_{c,r} [\sigma^2]_r\}^{-1} [EH_c(r,\omega)]^*_{c,r} [I]_c \tag{13}$$

Here, $[I]_c$ and $[\sigma^2]_r$ are the spectral power densities of the signal for each color channel and the noise:

$$[I]_c = E|[O_c(\omega)]_c|^2; [\sigma^2] = E|[N(r,\omega)]_r|^2 \tag{14}$$

If emission spectra of fluorophores overlap, then in each color channel shadows of an object from the other color channel may appear. Such shadow images are distorted with the same detection PSF as the main image in the actual color channel. As a result, an image detected in channel c, $O_c(\omega)$ is a superposition of the images $O_c^{TRUE}(\omega)$ according to the objects assigned to the different color channels:

$$[O_c(\omega)]_c = [M]_c [O_c^{TRUE}(\omega)]_c \tag{15}$$

Here, $[M]_c$ is a demixing matrix.

In the case of two colors, for example, the result is then:

$$\begin{cases} O_1(\omega) = m_{11} O_1^{TRUE}(\omega) + m_{12} O_2^{TRUE}(\omega) \\ O_2(\omega) = m_{21} O_1^{TRUE}(\omega) + m_{22} O_2^{TRUE}(\omega) \end{cases} \tag{16}$$

It is simple to obtain the true images $O_c^{TRUE}(\omega)$ if the mixing matrix $[M]_c$ thereof is known. If this is not the case, it can be obtained by minimizing a cross correlation between the generated images, i.e., the matrix is to be determined such that the values thereof ensure the lowest cross correlation for the objects which are demixed the best.

A further, and also alternative, procedure for analyzing the data of the surface detector 19 is based on the approach described by Sheppard et al., Optik 80, No. 2, p. 53, 1982.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for high-resolution scanning microscopy of a sample, the method comprising: exciting the sample by illumination radiation to emit fluorescence radiation in such a way that the illumination radiation is focused at a point in or on the sample to form a diffraction-limited illumination spot, displacing the point relative to the sample by means of a scanning device into different scanning positions with an increment of less than half the diameter of the illumination spot, imaging the point at an imaging resolution and in a diffraction-limited manner through the scanner into a diffraction image on a spatially resolving surface detector, wherein the imaging is done through the scanning device to generate a de-scanned diffraction image on the surface detector and wherein the surface detector has a spatial resolution that resolves a diffraction structure of the diffraction image, reading the surface detector, and generating an image of the sample from data of the surface detector and from the scanning positions assigned to said data, said image being a high-resolution image having a resolution beyond the imaging resolution using a spectrally selective module to generate the diffraction image to comprise a number of different diffraction structures on the surface detector, which number corresponds to the number of wavelength ranges for the purposes of distinguishing between at least two predetermined wavelength ranges, each of said different diffraction structures being point symmetric with respect to a center of symmetry and being located in full on the surface detector, wherein the different diffraction structures cover different regions in the image plane but have a common center of symmetry, and evaluating the different diffraction structures when generating the image of the sample.

2. The method as claimed in claim 1, wherein the at least two predetermined wavelength ranges are subject to a different phase manipulation.

3. The method as claimed in claim 2, wherein the spectrally selective module comprises a phase mask.

4. The method as claimed in claim 3, wherein only radiation at one wavelength is influenced by the phase mask while radiation at another wavelength is not, and so the diffraction structure of the radiation at the another wavelength is an Airy disk.

5. The method as claimed in claim 1, wherein the different diffraction structures are coaxial to each other.

6. The method as claimed in claim 1, wherein the different diffraction structures have a common basic structure but are rotated through an angle with respect to one another on the surface detector.

7. The method as claimed in claim 1, wherein the spectrally selective module only influences the illumination, wherein the illumination spot consists of illumination diffraction structures, which differ from each other but have a common center of symmetry.

8. The method as claimed in claim 1, wherein the spectrally selective module only influences the imaging, in particular is disposed upstream of the surface detector.

9. A microscope for high-resolution scanning microscopy, comprising a sample stage for receiving a sample which is excitable to emit fluorescence radiation, an optical unit which has a focal plane, located in the sample, stage, an illumination device, which has an entrance for supplying illumination radiation and illuminates, via the optical unit, the sample stage with the illumination radiation in such a way that the optical unit focuses the illumination radiation at a point in the focal plane to form a diffraction-limited illumination spot, a scanning device for displacing the point into different scanning positions with an increment of less than half the diameter of the illumination spot, an imaging device for diffraction-limited imaging of the point in the focal plane via the optical unit, at an imaging resolution and through the scanning device to generate a de-scanned diffraction image on a spatially resolving surface detector located in an image plane that is conjugate to the focal plane, wherein the surface detector has a spatial resolution that resolves a structure of the diffraction image, and an evaluation device for reading the surface detector, for evaluating a structure of the diffraction image from data of the surface detector and from the scanning positions assigned to said data, and for generating an image of the sample that is a high-resolution image having a resolution beyond the imaging resolution, wherein the evaluation device comprises control connections to the scanning device and the surface detector, wherein the microscope further comprises a spectrally selective module for distinguishing between at least two predetermined wavelength ranges, said selective module generating the diffraction image to comprise a number of different diffraction structures on the surface detector, said number corresponding to the number of wavelength ranges, wherein each of said different diffraction structures is point symmetric with respect to a center of symmetry and is located in full on the surface detector, wherein the different diffraction structures cover different regions in the image plane but have a common center of symmetry, and wherein the evaluation device evaluates the different diffraction structures when generating the image of the sample.

10. The microscope as claimed in claim 9, wherein the spectrally selective module comprises a phase mask for generating the diffraction structures, said phase mask subjecting the at least two predetermined wavelength ranges to different phase manipulation.

11. The microscope as claimed in claim 10, wherein the phase mask comprises at least one LCOS-SLM.

12. The microscope as claimed in claim 10, wherein the phase mask only influences radiation in one wavelength range but not radiation in another wavelength range, and so the diffraction structure of the radiation at the another wavelength is an Airy disk.

13. The microscope as claimed in claim 9, wherein the different diffraction structures are rotationally symmetric and coaxial to each other.

14. The microscope as claimed in claim 9, wherein the different diffraction structures have a common basic structure but are rotated through an angle with respect to one another on the surface detector.

15. The microscope as claimed in claim 9, wherein the spectrally selective module is disposed in the illumination device but not in the optical unit, which is also effective for the imaging, and so the illumination spot consists of illumination diffraction structures, which differ from each other but have a common center of symmetry.

16. The microscope as claimed in claim 9, wherein the spectrally selective module is disposed in the imaging device but not in the optical unit, which is also effective for the illumination.

* * * * *

UNITED STATES PATENT AND TRADEMARK OFFICE
CERTIFICATE OF CORRECTION

PATENT NO. : 11,573,412 B2
APPLICATION NO. : 16/621883
DATED : February 7, 2023
INVENTOR(S) : Ingo Kleppe and Ralf Netz It is certified that error appears in the above-identified patent and that said Letters Patent is hereby corrected as shown below:

On the Title Page

Item (54) and in the Specification Column 1, Lines 1-4:
Now reads: "High-Resolution Scanning Microscopy with Discrimination Between At Least Two Wave-Length Ranges"
Should read: -- High-Resolution Scanning Microscopy with Discrimination Between At Least Two Wavelength Ranges --

In the Specification

Column 9, Line 28:
Now reads: "the imaging device H or"
Should read: -- the imaging device or --

Column 14, (formula 4):
Now reads: "$EH(r,\omega)=FT''\{E(r')H(r'+r)$"
Should read: -- $EH(r,\omega)=FT_{r'}\{E(r')H(r'+r)\}$ --

Column 15, (formula 12):
Now reads: "$E|\{[O_c(\omega)]_c[EH_c(r,\omega)]_{c,r}+[N(r,\omega)]_r\}[G_c(r,\omega)]_{r,c}-[O_c(\omega)]|^2$"
Should read: -- $E|\{[O_c(w)]_c[EH_c(r,\omega)]_{c,r}+[N(r,\omega)]_r\}[G_c(r,\omega)]_{r,c}-[O_c(\omega)]_c|^2$ --

In the Claims

Column 16, Lines 60-61:
Now reads: "in the sample, stage"
Should read: -- in the sample stage --

Signed and Sealed this
Sixth Day of February, 2024

*Katherine Kelly Vidal*
Katherine Kelly Vidal
*Director of the United States Patent and Trademark Office*

Column 17, Line 5:
Now reads: "the optical unit, at an"
Should read: -- the optical unit at an --